(12) United States Patent
Jiang (10) Patent No.: US 12,025,887 B2
(45) Date of Patent: Jul. 2, 2024

(54) SHOOTING METHOD AND ELECTRONIC DEVICE (71) Applicant: VIVO MOBILE COMMUNICATION CO., LTD., Guangdong (CN)

(72) Inventor: Lue Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 142 days.

(21) Appl. No.: 17/696,699

(22) Filed: Mar. 16, 2022

(65) Prior Publication Data
US 2022/0206346 A1 Jun. 30, 2022

Related U.S. Application Data (63) Continuation of application No. PCT/CN2020/105557, filed on Jul. 29, 2020.

(30) Foreign Application Priority Data

Sep. 30, 2019 (CN) .......................... 201910945661.4

(51) Int. Cl.
H04N 23/73 (2023.01)
G02F 1/1335 (2006.01)
(Continued)

(52) U.S. Cl.
CPC .. *G02F 1/134309* (2013.01); *G02F 1/133528* (2013.01); *H04M 1/0264* (2013.01);
(Continued)

(58) Field of Classification Search
CPC ................. H04N 23/57; H04N 23/631; H04N 23/70–73; H10K 59/65; G09G 2360/14; G09G 3/36–38; H04M 1/0264
(Continued)

(56) References Cited

U.S. PATENT DOCUMENTS 6,952,299 B1 10/2005 Fukazawa et al.
7,250,963 B2 7/2007 Yuri et al.
(Continued)

FOREIGN PATENT DOCUMENTS

CN 1479152 A 3/2004
CN 101978314 A 2/2011
(Continued)

OTHER PUBLICATIONS

Extended European Search Report on the European Patent Application No. 20872630. 7 issued by the European Patent Office on Oct. 10, 2022.
(Continued)

*Primary Examiner* — Anthony J Daniels
(74) *Attorney, Agent, or Firm* — IP & T GROUP LLP (57) ABSTRACT

A shooting method applied to the electronic device including a display screen and a camera. The display screen includes a first polarizer and a second polarizer, and a liquid crystal is arranged between the first polarizer and the second polarizer. The method includes: adjusting an electrode voltage of the display screen as a target voltage value, where in a case that the electrode voltage of the display screen is the target voltage value, and a light transmittance of the display screen meets a preset condition; and acquiring a first image through the camera.

17 Claims, 6 Drawing Sheets (51) Int. Cl.

| | | |
|---|---|---|
| *G02F 1/1343* | (2006.01) | |
| *H04M 1/02* | (2006.01) | |
| *H04N 7/14* | (2006.01) | |
| *H04N 23/62* | (2023.01) | |
| *H04N 23/63* | (2023.01) | |
| *H04N 23/71* | (2023.01) | |

(52) U.S. Cl.
CPC ............ *H04N 7/144* (2013.01); *H04N 23/62* (2023.01); *H04N 23/633* (2023.01); *H04N 23/71* (2023.01); *H04N 23/73* (2023.01); *H04M 2250/52* (2013.01); *H04N 2007/145* (2013.01)

(58) Field of Classification Search
USPC ....................................................... 348/224.1
See application file for complete search history.

(56) References Cited

U.S. PATENT DOCUMENTS

| | | | | |
|---|---|---|---|---|
| 9,870,024 | B2* | 1/2018 | Evans, V | ............... H04N 23/57 |
| 2007/0242201 | A1* | 10/2007 | Hyatt | ........................ G03B 9/02 349/123 |
| 2016/0011458 | A1 | 1/2016 | Xu et al. | |
| 2016/0217750 | A1 | 7/2016 | Lee et al. | |
| 2017/0064213 | A1* | 3/2017 | Windmark | ............. H04N 5/265 |
| 2017/0123575 | A1* | 5/2017 | Evans, V | ............... H04N 23/55 |
| 2017/0124933 | A1 | 5/2017 | Evans, V et al. | |
| 2018/0120661 | A1 | 5/2018 | Kilgore et al. | |
| 2018/0239202 | A1 | 8/2018 | Ogura et al. | |
| 2019/0141227 | A1 | 5/2019 | Davis et al. | |
| 2019/0204612 | A1 | 7/2019 | Xiao et al. | |
| 2020/0117034 | A1 | 4/2020 | Yin et al. | |
| 2021/0141252 | A1* | 5/2021 | Takimoto | .......... G02F 1/133314 |
| 2021/0405434 | A1* | 12/2021 | Zhang | ............... G02F 1/133354 |
| 2022/0191367 | A1* | 6/2022 | Liu | ........................ H04N 23/55 |

FOREIGN PATENT DOCUMENTS

| | | | | | |
|---|---|---|---|---|---|
| CN | 103645590 | A | | 3/2014 | |
| CN | 106526943 | A | | 3/2017 | |
| CN | 108089341 | A | | 5/2018 | |
| CN | 108604108 | A | | 9/2018 | |
| CN | 108885376 | A | | 11/2018 | |
| CN | 109348123 | A | * | 2/2019 | ......... H04N 5/23216 |
| CN | 109348123 | A | | 2/2019 | |
| CN | 109618029 | A | | 4/2019 | |
| CN | 208780929 | U | | 4/2019 | |
| CN | 110264894 | A | | 9/2019 | |
| CN | 110602407 | A | | 12/2019 | |
| CN | 111432103 | B | * | 12/2021 | ........... H04N 5/2254 |
| JP | 2009271272 | A | * | 11/2009 | |

OTHER PUBLICATIONS

The First Office Action of Priority Application No. CN 201910945661.4 issued by the Chinese Patent Office on Aug. 27, 2020.
International Search Report and Written Opinion of International Application No. PCT/CN2020/105557 issued by the Chinese Patent Office on Oct. 22, 2020.

* cited by examiner

SHOOTING METHOD AND ELECTRONIC DEVICE

CROSS-REFERENCE TO RELATED APPLICATIONS

This application is a Bypass Continuation Application of PCT/CN2020/105557 filed on Jul. 29, 2020, which claims priority to Chinese Patent Application No. 201910945661.4 filed on Sep. 30, 2019, which are incorporated herein by reference in their entirety.

TECHNICAL FIELD

Embodiments of the present disclosure relate to the technical field of communication, and in particular, to a shooting method and an electronic device.

BACKGROUND

With the development of an electronic device technology, users use the electronic device (such as a smart phone) more and more frequently, and the camera function of the electronic device has gradually become one of the commonly used functions of users. Generally, when the traditional camera device takes pictures, a proper brightness may be usually obtained by adjusting an aperture (that is, a device in the camera for controlling the amount of light passing through the lens and entering the light-sensitive surface in the camera) of the camera, a shutter and an international standardization organization (ISO) value, so that a satisfactory photo can be taken.

However, for the traditional electronic device with an under-screen camera, due to the thickness limitation of the electronic device, the under-screen camera in the electronic device usually adopts a fixed aperture. In this way, when a user uses the electronic device to take pictures, due to the fixed light-entry amount, it is likely to cause a poor shooting effect.

SUMMARY

Embodiments of the present disclosure provide a shooting method and an electronic device.

According to a first aspect, embodiments of the present disclosure provide a shooting method, applied to an electronic device including a display screen and a camera, where the camera is located below the display screen, the display screen includes a first polarizer and a second polarizer, and a liquid crystal is arranged between the first polarizer and the second polarizer. The method includes:

adjusting an electrode voltage of the display screen as a target voltage value, where in a case that the electrode voltage of the display screen is the target voltage value, a light transmittance of the display screen meets a preset condition; and acquiring a first image through the camera.

According to a second aspect, embodiments of the present disclosure provide an electronic device. The electronic device includes a display screen and a camera, where the camera is located below the display screen, the display screen includes a first polarizer and a second polarizer, and a liquid crystal is arranged between the first polarizer and the second polarizer. The electronic device includes:

an adjusting module, configured to adjust an electrode voltage of the display screen as a target voltage value, where in a case that the electrode voltage of the display screen is the target voltage value, a light transmittance of the display screen meets a preset condition; and an acquisition module, configured to acquire a first image through the camera.

According to a third aspect, embodiments of the present disclosure provide an electronic device, including a processor, a memory, and a computer program stored in the memory and executable on the processor. When the computer program is executed by the processor, the steps of the shooting method according to the first aspect are implemented.

According to a fourth aspect, embodiments of the present disclosure provide a non-transitory computer readable storage medium, where the non-transitory computer readable storage medium stores a computer program, and when the computer program is executed by a processor, steps of the shooting method according to the first aspect are implemented.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that "/" in the specification indicates the meaning of "or", for example, A/B may indicate A or B; "and/or" in the specification merely describes the association relationship between the associated objects and indicates that there may be three relationships. For example, A and/or B may indicate three cases where only A exists, A and B exist at the same time, or only B exists.

It should be noted that "a plurality of" in the specification refers to two or more.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme. To be precise, the use of the term such as "exemplary" or "for example" is intended to present a related concept in a specific manner.

A shooting method provided by the embodiment of the present disclosure may be performed by the above electronic device (including a mobile electronic device and a non-mobile electronic device), or may also be performed by a functional module and/or functional entity that can implement the shooting method in the electronic device, which may be specifically determined according to the actual use requirement and is not limited by the embodiment of the present disclosure. Taking the electronic device as an example, the following exemplarily describes the shooting method provided in the embodiments of the present disclosure.

The electronic device in the embodiment of the present disclosure may be a mobile terminal device, or may also be a non-mobile terminal device. The mobile terminal device may be a mobile phone, a tablet computer, a laptop computer, a palmtop computer, a vehicle-mounted terminal device, a wearable device, an ultra-mobile personal computer (UMPC), a netbook, or a personal digital assistant (PDA). The non-mobile terminal device may be a personal computer (PC), a television (TV), an automated teller machine or a self-service machine. This is not specifically limited in the embodiments of the present disclosure.

Exemplarily, the electronic device in the embodiment of the present disclosure includes a display screen and a camera, where the camera is located below the display screen; and the display screen includes: a polarizer, an electrode and a liquid crystal. Exemplarily, one polarizer and one electrode are arranged above or below the display screen respectively, the electrode is located on an inner side of each polarizer, and liquid crystal modules are filled in the display screen.

Figure 1:
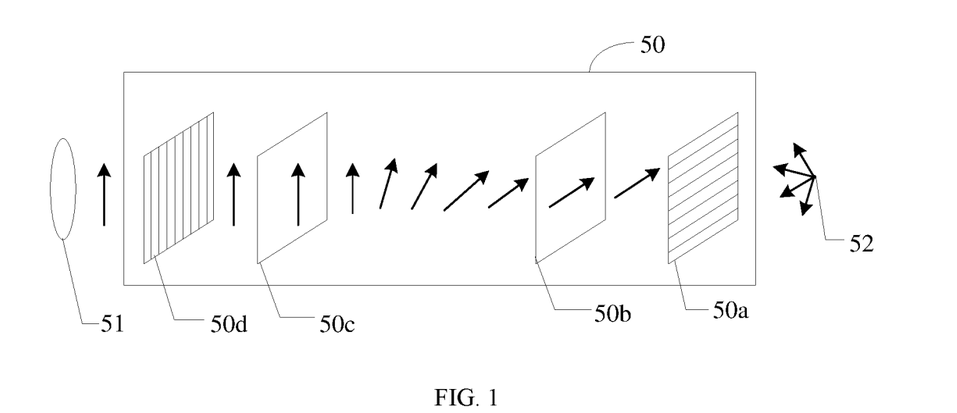
FIG. 1 is a schematic diagram that incident light passes through a display screen according to an embodiment of the present disclosure.

Exemplarily, FIG. 1 is a schematic diagram that incident light passes through a display screen according to an embodiment of the present disclosure. As shown in FIG. 1, the display screen 50 includes: an upper polarizer 50a, an upper electrode 50b, a lower electrode 50c and a lower polarizer 50d. The camera 51 is located below the display screen 50; the upper polarizer 50a, the upper electrode 50b, the lower electrode 50c and the lower polarizer 50d are sequentially superposed to form the display screen 50; the upper polarizer 50a may transmit transverse light and block longitudinal light; the lower polarizer 50d may transmit longitudinal light and block transverse light; and liquid crystal modules are filled between the upper electrode 50b and the lower electrode 50c.

Optionally, incident light 52 will pass through the upper polarizer 50a after entering the display screen 50, and the upper polarizer 50a will block the longitudinal light in the incident light 52 and will only transmit the transverse light in the incident light 52. In the embodiment of the present disclosure, the electronic device applies a certain voltage to the upper electrode 50b and the lower electrode 50c, so that the liquid crystal molecule between the upper electrode 50b and the lower electrode 50c is subjected to electric field effect of a twisted phased array, and the deflection angle of the light passing through the upper polarizer 50a is changed. When the voltage value reaches a certain value, the transverse light passing through the upper polarizer 50a is changed into longitudinal light so as to pass through the lower polarizer 50b to enter the camera 51. In this way, the transmittance of the incident light passing through the display screen is controlled.

Figure 2:
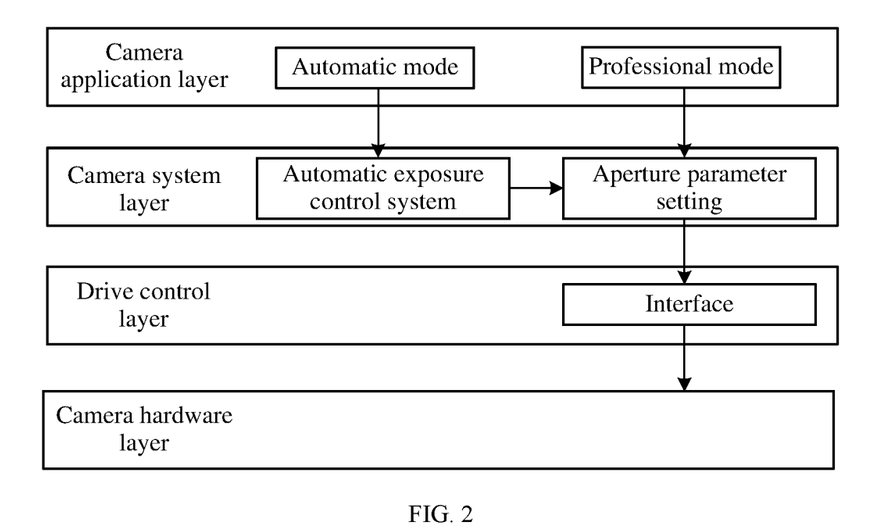
FIG. 2 is a schematic diagram of an architecture of a possible camera system according to an embodiment of the present disclosure.

Exemplarily, FIG. 2 is a schematic diagram of an architecture of a possible camera system according to an embodiment of the present disclosure. As shown in FIG. 2, the architecture of the camera system includes four layers, namely: a camera hardware layer, a drive control layer, a camera system layer and a camera application layer, where the camera hardware layer includes two parts: a display screen and a camera.

The drive control layer is mainly configured to provide an interface for the camera system. The interface includes registration, initialization, dormancy, wake-up, a SetAperture function and a GetAperture function, wherein the registration and the initialization provides a module registration process of an Android operating system kernel for drive; the dormancy and the wake-up provide dormancy and wake-up processes for drive; when the camera system is in dormancy, display screen control will be released and electricity consumption will be reduced; and when the camera system is waken up, the previous setting will be restored.

An input parameter of the SetAperture function is a transmittance of the display screen; in a case of returning successfully or unsuccessfully, the function execution result will adjust the transmittance of the display screen according to the input parameter.

The GetAperture function returns the current transmittance.

The camera system layer is configured to control data conversion between the camera application layer and the drive control layer. The camera system layer is further configured to receive a command of the camera application layer (that is, the input parameter is an aperture value), converts the aperture value into the transmittance of the drive control layer according to the command, and transmit the transmittance to the drive control layer.

The camera application layer provides two control modes: an automatic mode and a professional mode.

The electronic device in the embodiment of the present disclosure may be an electronic device with an operating system. The operating system may be an Android operating system, an iOS operating system, or other possible operating systems, which is not specifically limited in the embodiments of the present disclosure.

The following uses the Android operating system as an example to describe a software environment to which the shooting method provided in the embodiments of the present disclosure is applied.

Figure 3:
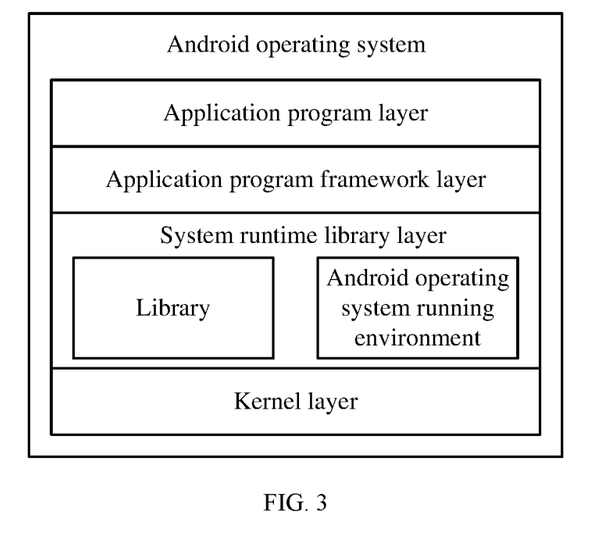
FIG. 3 is a schematic diagram of an architecture of a possible Android operating system according to an embodiment of the present disclosure.

FIG. 3 is a schematic architectural diagram of a possible Android operating system according to an embodiment of the present disclosure. In FIG. 3, the architecture of the Android operating system includes 4 layers, namely: an application program layer, an application framework layer, a system runtime library layer, and a kernel layer (it may be the Linux kernel layer).

The application layer includes various applications in the Android operating system (including system applications and third-party applications).

The application framework layer is a framework of applications. A developer may develop some applications based on the application framework layer while complying with development principles of the application framework.

The system runtime library layer includes a library (also referred to as a system library) and a running environment of the Android operating system. The library mainly provides various resources required for the Android operating system. The running environment of the Android operating system is configured to provide a software environment for the Android operating system.

The kernel layer is an operating system layer of the Android operating system, and is a lowest layer of software levels of the Android operating system. The kernel layer provides core system services and hardware-related driver programs for the Android operating system based on the Linux kernel.

The Android operating system is used as an example. In the embodiments of the present invention, a developer may develop, based on the system architecture of the Android operating system shown in FIG. 3, a software program to implement the shooting method provided in the embodiments of the present invention, so that the shooting method can run based on the Android operating system shown in FIG. 3. That is, a processor or the electronic device may run the software program in the Android operating system to implement the shooting method provided in the embodiment of the present disclosure.

Figure 4:
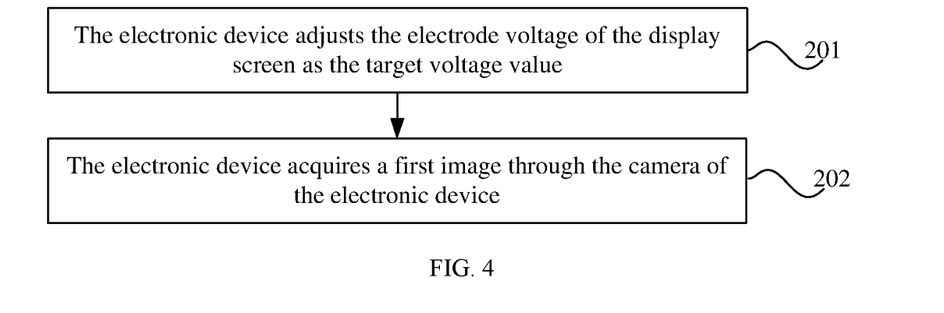
FIG. 4 is a schematic diagram of an architecture of a shooting method according to an embodiment of the present disclosure.

The shooting method provided by the embodiment of the present disclosure is described below with reference to the flowchart of the shooting method shown in FIG. 4. FIG. 4 is a schematic flowchart of a shooting method according to an embodiment of the present disclosure. The method includes step 201 and step 202.

Step 201: the electronic device adjusts the electrode voltage of the display screen as the target voltage value;

in a case that the electrode voltage of the display screen of the electronic device is the target voltage value, a light transmittance of the display screen of the electronic device meets a preset condition.

Exemplarily, that the light transmittance of the display screen of the electronic device meets the preset condition refers to: the light transmittance of the display screen of the electronic device reaches a predetermined light transmittance;

optionally, the predetermined light transmittance may be: a light transmittance of the display screen corresponding to a target aperture value. Of course, that the light transmittance meets the preset condition may also refer to: the light transmittance is less than the predetermined light transmittance, and the light transmittance is matched with the current scenario of the electronic device, which is not specifically limited by the embodiments of the present disclosure.

Exemplarily, the light transmittance of the display screen is related to the light transmittance corresponding to the aperture value. In this way, the terminal device may adjust the aperture of the display screen to an appropriate aperture by adjusting the voltage value.

Step 202: the electronic device acquires a first image through the camera of the electronic device.

According to the shooting method provided by the embodiments of the present disclosure, the electrode voltage of the display screen of the electronic device is adjusted as the target voltage value. When the electrode voltage of the display screen of the electronic device is the target voltage value, the first image is acquired through the camera of the electronic device. When the electrode voltage of the display screen of the electronic device is the target voltage value, the light transmittance of the display screen of the electronic device meets a preset condition. Therefore, the embodiments of the present disclosure may perform shooting when the light transmittance of the display screen of the electronic device meets the preset condition, so that the shooting result can meet the specific requirements of users.

Optionally, in the embodiments of the present disclosure, after the step 201, the method may further include the following steps.

Step A: the electronic device displays target aperture information corresponding to the target voltage value in the shooting interface.

Exemplarily, the target aperture information includes at least one of the following: an aperture pattern or an aperture value, where the aperture pattern can represent a real-time aperture value of the camera in the electronic device, that is, the aperture pattern may feed back the real-time aperture value to a user timely.

In one example, when the electronic device adjusts the electrode voltage of the display screen, the size of the corresponding aperture value may be displayed in the shooting interface in real time, so that the real-time aperture value is fed back to a user timely.

Figure 5:
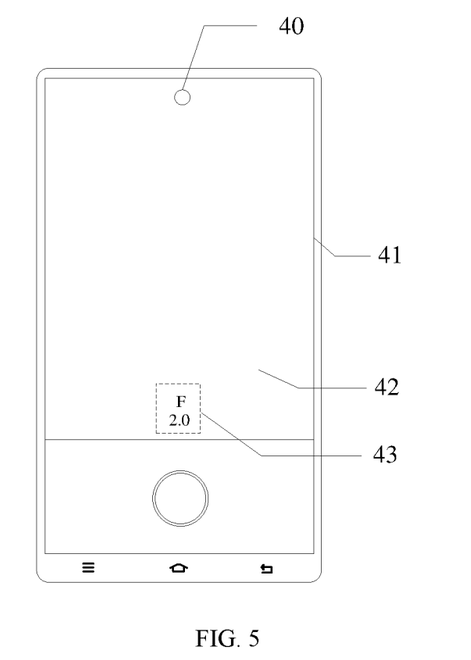
FIG. 5 is a first schematic diagram of a shooting interface of an electronic device according to an embodiment of the present disclosure.

For example, taking the case where the electronic device is a mobile phone as an example, as shown in FIG. 5, the mobile phone includes: a camera (that is, 40 in FIG. 5) and a display screen (that is, 41 in FIG. 5), and the camera is located at the top of the display screen. When a user uses the mobile phone for shooting, the mobile phone displays the shooting interface (that is, 42 in FIG. 5). After the mobile phone determines the target aperture value, the electrode voltage of the display screen is adjusted as a target voltage value, and a target aperture value (that is, 43 in FIG. 5, for example, F=2.0 shown in FIG. 5) corresponding to the target voltage value is displayed above a shooting control of the shooting interface.

Optionally, in the embodiments of the present disclosure, before the step 201, the method further includes:

step 301: the electronic device determines the target aperture value of the camera.

It should be noted that the aperture in the embodiments of the present disclosure is not the aperture value of a real aperture, but the camera in the electronic device has the same aperture effect compared with other cameras with adjustable apertures. That is, in the embodiments of the present disclosure, the target aperture value may represent one specific aperture effect.

Optionally, the step 202 may include the following step 302.

Step 302: the electronic device adjusts the electrode voltage of the display screen as a target voltage value corresponding to the target aperture value;

in a case that the electrode voltage of the display screen is the target voltage value, the transmittance of light in the display screen is matched with the light transmittance corresponding to the target aperture value.

Exemplarily, that the transmittance of the light in the display screen is matched with the light transmittance corresponding to the target aperture value refers to: the transmittance of the light in the display screen is as same that the light transmittance corresponding to the target aperture value, or a difference value between the transmittance of the light in the display screen and the light transmittance corresponding to the target aperture value is less than or equal to a preset threshold.

Exemplarily, when the electronic device applies a voltage to the electrode in the display screen, the liquid crystal molecules in the display screen are subjected to the action of the voltage, so that electric field effect of a twisted phase array occurs in the liquid crystal molecules, the deflection angle of light is changed, and the transmittance of light in the display screen is controlled.

Exemplarily, the aperture value of the camera is mainly used to adjust the transmittance of light in the camera. Generally, the larger the aperture value of the camera, the smaller the transmittance of light in the camera; conversely, the smaller the aperture value of the camera, the larger the transmittance of light in the camera.

Exemplarily, the aperture value of the camera is mainly used to adjust the transmittance of light in the camera, and the change of the electrode voltage in the display screen will also lead to the transmittance of light in the display screen. When the camera in the electronic device is arranged below the display screen, the transmittance of light in the camera is equal to the transmittance of light in the display screen, so the electronic device may adjust the transmittance of light in the camera by adjusting the electrode voltage in the display screen, that is, the aperture value of the camera is adjusted.

Exemplarily, the aperture value of the camera is inversely proportional to the electrode voltage value of the display screen. That is, the smaller the aperture value of the camera, the larger the electrode voltage value corresponding to the display screen; conversely, the larger the aperture value of the camera, the smaller the electrode voltage value of the corresponding display screen.

For example, example 1: when the electrode voltage value of the display screen is a maximum, the deflection angle of the light in the liquid crystal molecules is exactly 90 degrees, and at this time, the light will all pass through the lower polarizer in the display screen, and the corresponding aperture value is a minimum; example 2: when the aperture of the camera is a minimum, the electrode voltage value of the corresponding display screen is 0, and at this time, light does not deflect in the display screen, and the transmittance of the light in the display screen is 0, that is, no light passes through the lower polarizer in the display screen; and example 3: when the aperture is between the minimum and the maximum, the electrode voltage value of the corresponding display screen is between the maximum and the minimum, and the light partially passes through the lower polarizer in the display screen.

Exemplarily, a mapping relationship between the aperture value of the camera and the transmittance of light in the display screen may be expressed by the following formula 1:

$$I = \lambda \left(\frac{1}{F}\right)^2.$$

Based on the formula 1, it may be known that the transmittance of light in the display screen is inversely proportional to the square of the aperture value of the camera;

in the formula 1, I is the transmittance of light in the display screen, $\lambda$ is an aperture coefficient, and F is an aperture value. For example, in a case that the target aperture value is the fixed aperture of the electronic device itself $F_{min}$, at this time, the transmittance of light in the display screen is 100%, that is, the light all passes through the lower polarizer in the display screen, that is, I is 100%, and $\lambda = F_{min}^2$. Generally, as the aperture value of the camera gradually increases, the transmittance of the corresponding light in the display screen gradually decreases.

Thus, the electronic device may adjust the electrode voltage of the display screen as the target voltage value corresponding to the target aperture value by determining the target aperture value of the camera, where in a case that the electrode voltage of the display screen is the target voltage value, the light transmittance of the display screen is matched with the light transmittance corresponding to the target aperture value. In this way, the electronic device may adjust the light transmittance by controlling the electrode voltage of the display screen to achieve the effect of adjusting the aperture, so that the problem that the adjustable light range is limited caused by that the camera in the electronic device adopts the fixed aperture.

Optionally, in the embodiments of the present disclosure, when the electronic device determines the target aperture of the camera, it may be implemented at least through the following two implementation manners.

In a first possible implementation manner

Exemplarily, before the step 301, the method further includes step 301a and step 301b.

Step 301a: the electronic device displays a shooting interface.

Step 301b: the electronic device receives a first input performed by a user on the shooting interface.

Optionally, in combination with the step 301a and the step 301b, the step 301 may include step 301c.

Step 301c: the electronic device determines the target aperture value of the camera in response to the first input.

Exemplarily, the first input may include: a click input performed by a user on the shooting interface, or a slide input performed by a user on the shooting interface, or a press input performed by a user on the shooting interface, or other feasible inputs performed by a user on the display screen, which may be specifically determined according to the actual use requirements and is not limited by the embodiments of the present disclosure.

Exemplarily, the click input may be a single-click input, a double-click input or a click input for any times; the click input may also be a long-press input or a short-press input, the slide input may be a slide input towards any directions, for example, upward slide, downward slide, leftward slide or rightward slide, and the slide track of the slide input may be a straight line or may also be a curve, which may be specifically set according to the actual requirements.

In one example, the shooting interface includes a target adjusting control, and the first input is a first input for the target adjusting control.

In one example, the target adjusting control may be superposed and displayed on the shooting interface with a preset transparency. For example, in a case that the preset transparency is recorded as T1, a value range of T1 may be 0%<T1<100%. In addition, the target adjusting control may also be displayed on the shooting interface with a high brightness or a low brightness, which is not limited by the embodiments of the present disclosure.

It should be noted that a shape of the target adjusting control may be a circle, a rectangle, a triangle, a diamond, a ring, a polygon or any possible shapes, or may also be directly a specific value, which may be specifically determined according to the actual use requirements and is not limited by the embodiments of the present disclosure.

Example 1: taking the case where the target adjusting control is adjusting buttons "+" and "−" as an example, a user increases the aperture value of the camera according to a preset proportion by clicking the button "+" displayed on the screen, and reduces the aperture value of the camera according to a preset proportion by clicking the button "−".

Example 2: taking the case where the target adjusting control is an aperture value scroll bar as an example, the proportion on the aperture value scroll bar is 0-100%, and a user may increase or reduce the adjusting proportion through the slide input or click input on the aperture value scroll bar, so that the aperture value of the camera is adjusted.

In a second possible implementation manner

Exemplarily, the step 301 includes step 301d1 or step 301d2.

Step 301d1: the electronic device adjusts an exposure value of the camera.

Step 301d2: in a case that a target brightness corresponding to a current exposure value is matched with a preset brightness, the electronic device takes the aperture value corresponding to the current exposure value as the target aperture value;

the target brightness is a brightness of a picture shot by the camera under that the current exposure value.

It should be noted that the preset brightness may be a fixed value, or may also be flexibly adjusted according to the actual application scenario, which will not be limited by the embodiment of the present disclosure.

Exemplarily, the exposure value of the camera includes an exposure time, a photosensitivity value and an aperture value.

Exemplarily, association relationships between the exposure value of the camera and the exposure time, the exposure value and the photosensitivity value, and the exposure value and the aperture value may be represented by a formula 2, where the formula 2 is:

$$2^{EV} = T \times ISO \times \frac{1}{F^2},$$

EV is the exposure value, T is the exposure time, ISO is the photosensitivity value, and F is the aperture value.

Exemplarily, when taking the aperture value corresponding to the current exposure value as the target aperture value, the electronic device may also adjust the current exposure time as the exposure time corresponding to the current exposure value and adjust the current exposure time as the photosensitivity value corresponding to the current exposure value.

Exemplarily, that the target brightness corresponding to the current exposure value is matched with the preset brightness may be: an absolute difference value between the target brightness corresponding to the current exposure value and the preset brightness is greater than or equal to 0 and is less than a predetermined threshold.

Exemplarily, when determining the aperture value corresponding to the current exposure value, the electronic device may determine the aperture value corresponding to the current exposure value according to a first corresponding relationship table, where the first corresponding relationship table is used to represent a corresponding relationship between the exposure value and exposure parameters (that is, an aperture value, or between at least one of an exposure time or a photosensitivity value and an aperture).

In one example, the electronic device takes the current exposure value (that is, the current adjusted exposure value) as an index and searches for the aperture value corresponding to the current exposure value in the first corresponding relationship table.

In one example, in a case that the first corresponding relationship table includes: an exposure time, a photosensitivity value and an aperture, the exposure value in the first corresponding relationship table sequentially increases from small to large; moreover, the first corresponding relationship table may be divided into two parts, the exposure time and the photosensitivity value of all the exposure values in the first part are fixed values, fixed aperture values of all the exposure values in the second part are fixed values, and the exposure time and the photosensitivity value gradually increase from small to large alternately.

Exemplarily, when determining the target brightness corresponding to the current exposure value, the electronic device may determine the target brightness corresponding to the current exposure value based on a pre-configured second corresponding relationship table, where the second corresponding relationship table is used to represent a corresponding relationship between the exposure value of the camera and an image brightness. The image brightness corresponding to each exposure value in the second corresponding relationship table may be an experience value, or may also an image brightness (for example, an average value of the brightness of the image) of an image shot by the electronic device with the exposure value, which is not limited by the embodiments of the present disclosure.

In one example, the electronic device adjusts the exposure value of the camera, takes the current exposure value (that is, the current adjusted exposure value) as an index, and searches for the target brightness corresponding to the current exposure value in the second corresponding relationship table. When the target brightness is matched with the preset brightness, the aperture value corresponding to the current exposure value is taken as the target aperture value, then the electrode voltage of the display screen is adjusted as the target voltage value corresponding to the target aperture value, and automatic demodulation of the aperture value is completed, that is, automatic adjustment of the exposure value is completed.

Exemplarily, when starting an automatic exposure mode, the electronic device determines the current exposure value and compares the target brightness of the current exposure value with the preset brightness (target). In a case that the target brightness is greater than the target, the current exposure value is reduced; and in a case that the target brightness is less than the target, the current exposure value is increased. Then, shooting is performed with a newly set exposure value to obtain a picture, the brightness average value of the picture is calculated, and the brightness average value is matched with the target. If matched, automatic adjustment of exposure is completed; and if not matched, the above action is continuously repeated until the brightness average value of the shot picture is equal to the target, and automatic adjustment of exposure is completed.

Exemplarily, when starting an automatic exposure mode, the electronic device determines the current exposure value and compares the target brightness of the current exposure value with the preset brightness (target). In a case that the target brightness is greater than the target, the current exposure value is reduced according to the second corresponding relationship table; and in a case that the target brightness is less than the target, the current exposure value is increased according to the second corresponding relationship table. Then, shooting is performed with a newly set exposure value to obtain a picture, the brightness average value of the picture is calculated, and the brightness average value is matched with the target. If matched, automatic adjustment of exposure is completed; and if not matched, the above action is continuously repeated until the brightness average value of the shot picture is equal to the target, and automatic adjustment of exposure is completed.

Optionally, in the embodiments of the present disclosure, when the electronic device adjusts the electrode voltage in the display screen, the power consumption of the electronic device may be reduced by adjusting the electrode voltage of part of area of the display screen.

Exemplarily, the step 302 includes step 302a.

Step 302a: the electronic device adjusts the electrode voltage of the target area corresponding to the camera in the display screen as the target voltage value.

Exemplarily, the target area is an area located above the camera and corresponding to the size of the camera.

Figure 6:
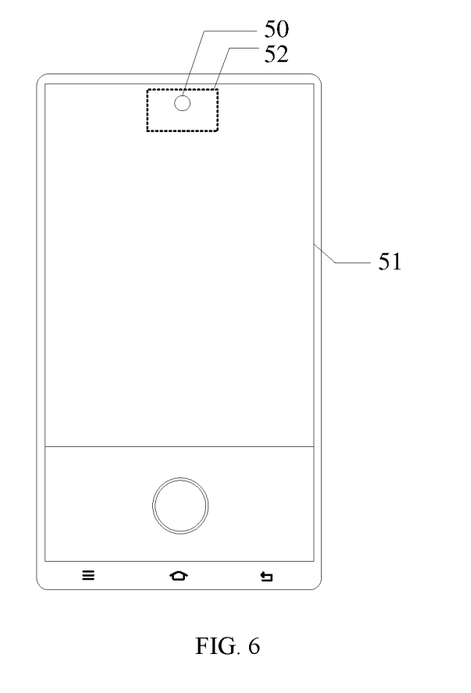
FIG. 6 is a second schematic diagram of a shooting interface of an electronic device according to an embodiment of the present disclosure.

For example, taking the case where the electronic device is a mobile phone as an example, as shown in FIG. 6, the mobile phone includes: a camera (that is, 50 in FIG. 6) and a display screen (that is, 51 in FIG. 6), and the camera is located at the top of the display screen. When the mobile phone determines the target aperture value, the mobile phone may adjust the electrode voltage of the target area (that is, 52 in FIG. 6) in the display screen 51 as the target voltage value corresponding to the target aperture value. As shown in FIG. 6, the target area 52 is an area where the camera 50 in the display screen 51 is located, that is, a middle area at the top of the display screen.

In this way, the electronic device adjusts the electrode voltage of the target area as the target voltage value by adjusting the electrode voltage of the target area corresponding to the camera in the display screen of the electronic device so as adjust the light transmittance by controlling the electrode voltage of part of the area of the display area corresponding to the camera, thereby achieving the effect of adjusting the aperture only by adjusting the target area of the display screen corresponding to the camera.

Figure 7:
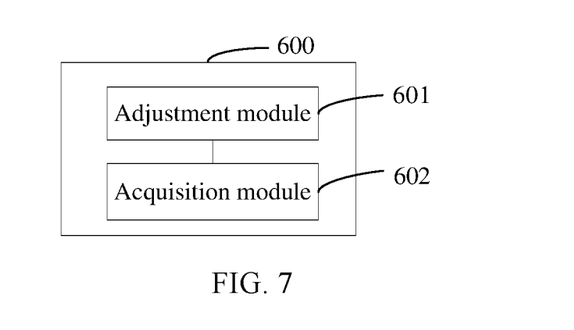
FIG. 7 is a first structural schematic diagram of an electronic device according to an embodiment of the present disclosure.

FIG. 7 to FIG. 12 are possible structural schematic diagrams of an electronic device according to embodiments of the present disclosure. As shown in FIG. 7 to FIG. 12, the electronic device 600 includes a display screen and a camera, where the camera is located below the display screen, the display screen includes a first polarizer and a second polarizer, and a liquid crystal is arranged between the first polarizer and the second polarizer (not shown in FIG. 7 to FIG. 12). The electronic device 600 further includes: an adjusting module 601 and an acquisition module 602;

the adjusting module 601 is configured to adjust the electrode voltage of the display screen as the target voltage value, where in a case that the electrode voltage of the display screen is the target voltage value, a light transmittance of the display screen meets a preset condition; and the acquisition module 602 is configured to acquire a first image through the camera.

Figure 8:
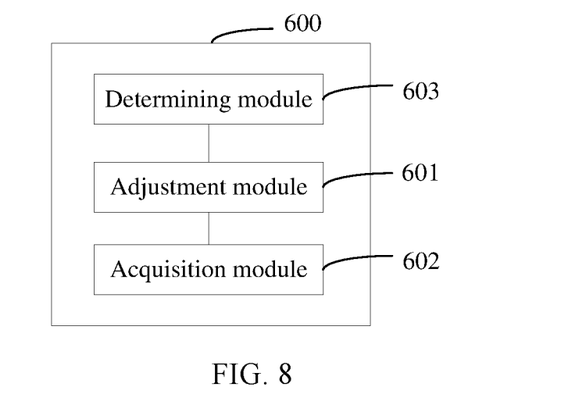
FIG. 8 is a second structural schematic diagram of an electronic device according to an embodiment of the present disclosure.

Optionally, as shown in FIG. 8, the electronic device 600 further includes a determination module 603, where the determination module 603 is configured to determine a target aperture value of the camera. The adjusting module 601 may be configured to adjust the electrode voltage of the display screen as the target voltage value corresponding to the target aperture value determined by the determination module 603. In a case that the electrode voltage of the display screen is the target voltage value, the light transmittance of the display screen is matched with the light transmittance corresponding to the target aperture value.

Figure 9:
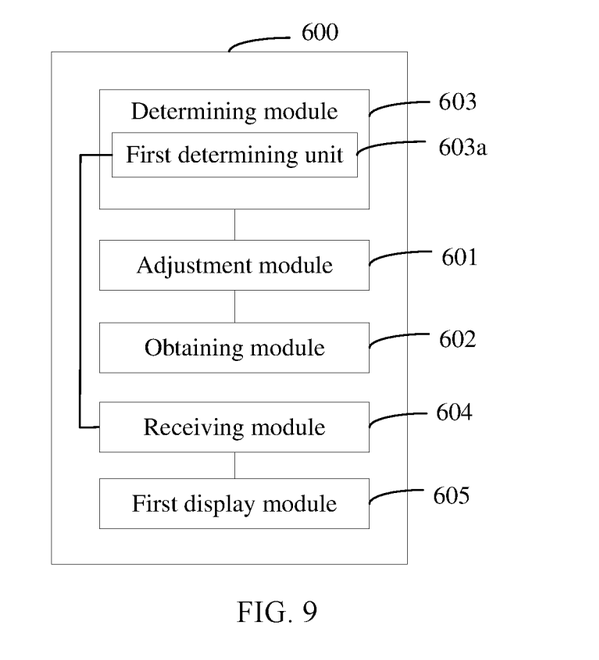
FIG. 9 is a third structural schematic diagram of an electronic device according to an embodiment of the present disclosure.

Optionally, as shown in FIG. 9, the electronic device further include a first display module 604 and a receiving module 605, where the first display module 604 is configured to display a shooting interface; and the receiving module 605 is configured to receive a first input performed by a user on the shooting interface displayed by the first display module 604. Optionally, as shown in FIG. 9, the determination module 603 includes a first determination unit 603a;

the first determination unit 603a is configured to determine a target aperture value of the camera in response to the first input received by the receiving module 605.

Optionally, the shooting interface includes a target adjusting control; and the first input is a first input for the target adjusting control.

Figure 10:
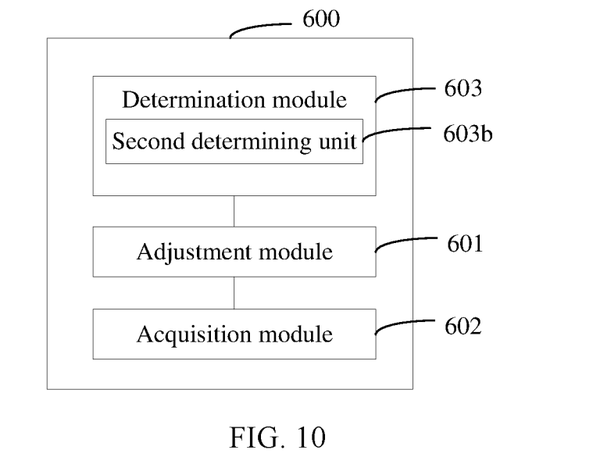
FIG. 10 is a fourth structural schematic diagram of an electronic device according to an embodiment of the present disclosure.

Optionally, as shown in FIG. 10, the determination module 603 includes a second determination unit 603b, where the second determination unit 603b is configured to adjust an exposure value of the camera; in a case that a target brightness corresponding to the current exposure value is matched with a preset brightness, the aperture value corresponding to the current exposure value is taken as a target aperture value; and the target brightness is a brightness of a picture shot by the camera under the current exposure value.

Figure 11:
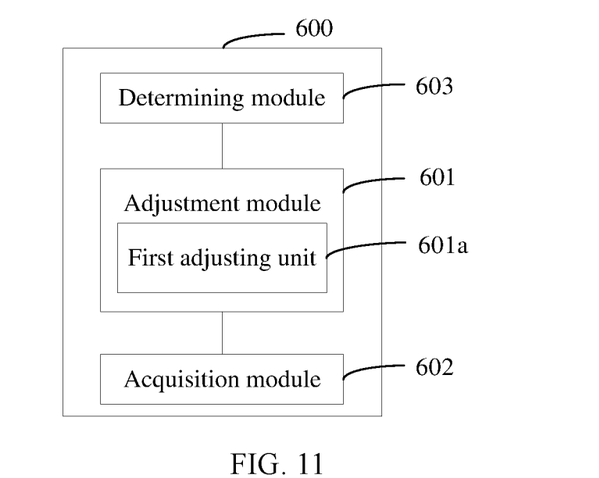
FIG. 11 is a fifth structural schematic diagram of an electronic device according to an embodiment of the present disclosure.

Optionally, as shown in FIG. 11, the adjusting module 601 includes a first adjusting unit 601a, where the first adjusting unit 601a is configured to adjust the electrode voltage of the target area corresponding to the camera in the display screen as the target voltage value.

Figure 12:
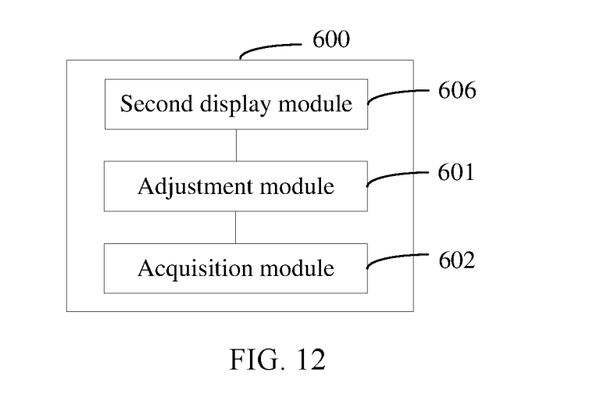
FIG. 12 is a sixth structural schematic diagram of an electronic device according to an embodiment of the present disclosure.

Optionally, as shown in FIG. 12, the electronic device 600 further includes a second display module 606, where the second display module 606 is configured to display target aperture information corresponding to the target voltage value in the shooting interface.

In the electronic device provided by the embodiments of present disclosure, the electronic device adjusts the electrode voltage of the display screen of the electronic device as the target voltage value. When the electrode voltage of the display screen of the electronic device is the target voltage value, the first image is acquired through the camera of the electronic device. When the electrode voltage of the display screen of the electronic device is the target voltage value, the light transmittance of the display screen of the electronic device meets a preset condition. Therefore, the embodiments of the present disclosure may perform shooting when the light transmittance of the display screen of the electronic device meets the preset condition, so that the shooting result can meet the specific requirements of users.

The electronic device provided by the embodiments of the present disclosure can implement the processes implemented by the electronic device in the method embodiment. To avoid repetition, details are not described herein again.

Figure 13:
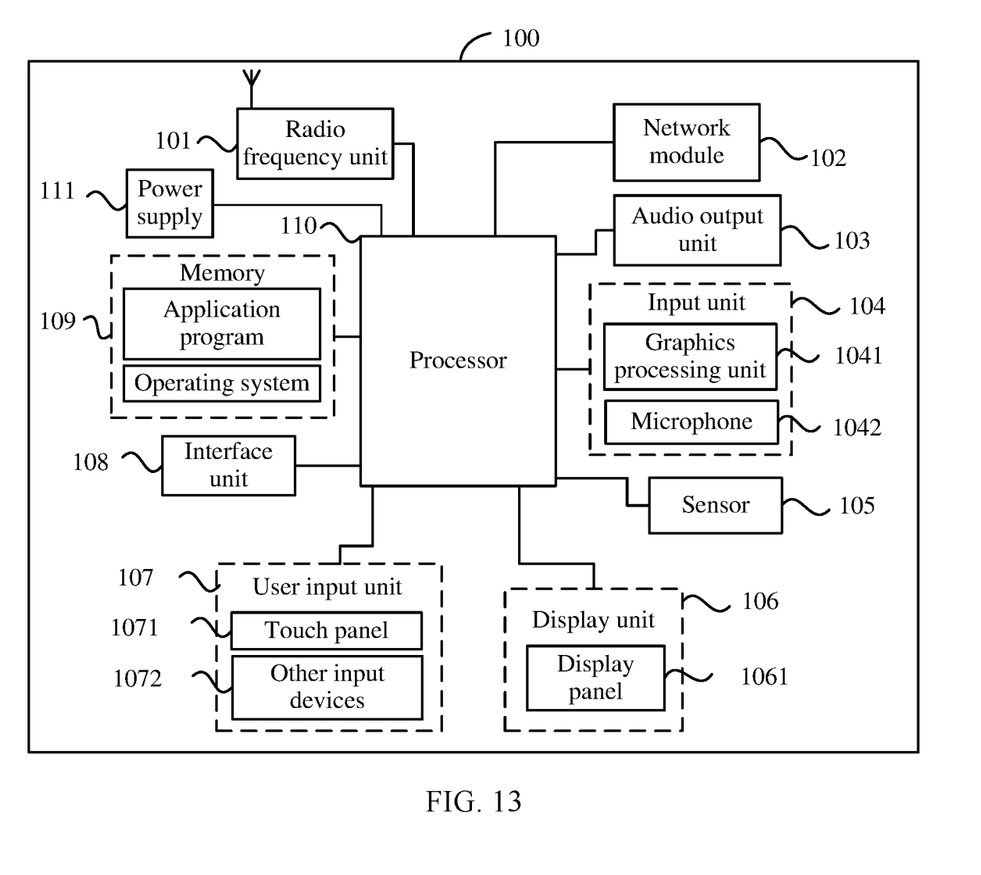
FIG. 13 is a schematic diagram of a hardware structure of a terminal device according to an embodiment of the present disclosure.

The case where the electronic device is a terminal device is taken as an example. FIG. 13 is a schematic diagram of a hardware structure of a terminal device implementing the embodiments of the present disclosure. The terminal device 100 includes, but not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that a structure of the terminal device 100 shown in FIG. 13 does not constitute a limitation on the terminal device, and the terminal device 100 may include more or fewer components than those shown in the figure, or combine some components, or have different component arrangements. In this embodiment of the present disclosure, the terminal device 100 includes, but is not limited to, a mobile phone, a tablet computer, a notebook computer, a palmtop computer, a vehicle-mounted terminal, a wearable device, a pedometer, or the like. In addition, the terminal device 100 further includes a display screen and a camera, where the camera is located below the display screen.

The processor 110 is configured to adjust the electrode voltage of the display screen as the target voltage value, where in a case that the electrode voltage of the display screen is the target voltage value, the light transmittance of the display screen meets the preset condition, and the first image is acquired through the camera of the terminal device.

According to the terminal device provided by the embodiments of the present disclosure, the electrode voltage of the display screen of the electronic device is adjusted as the target voltage value. When the electrode voltage of the display screen of the electronic device is the target voltage value, the first image is acquired through the camera of the terminal device. When the electrode voltage of the display screen of the electronic device is the target voltage value, the light transmittance of the display screen of the electronic device meets a preset condition, and the light transmittance of the display screen is related to the light transmittance corresponding to the aperture value. Therefore, the embodiments of the present disclosure may perform shooting when the light transmittance of the display screen of the electronic device meets the preset condition, so that the shooting result can meet the specific requirements of users.

It should be understood that, in this embodiment of the present disclosure, the radio frequency unit 101 may be configured to receive and transmit information or a signal in a call process. For example, after receiving downlink data from a base station, the radio frequency unit 101 transmits the downlink data to the processor 110 for processing. In addition, the radio frequency unit 101 transmits uplink data to the base station. Generally, the radio frequency unit 101 includes but is not limited to, an antenna, at least one amplifier, a transceiver, a coupler, a low noise amplifier, a duplexer, and the like. In addition, the radio frequency unit 101 may further communicate with another communications device through a wireless communication system and network.

The terminal device 100 provides a user with wireless broadband Internet access through the network module 102, for example, helping the user to send and receive an e-mail, browse a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received voice, or a message received voice) related to a specific function executed by the terminal device 100. The audio output unit 103 includes a loudspeaker, a buzzer, a receiver, and the like.

The input unit 104 is configured to receive an acoustic signal or a video signal. The input unit 104 may include a graphics processing unit (GPU) 1041 and a microphone 1042. The graphics processing unit 1041 processes image data of a static picture or a video obtained by an image capture apparatus (for example, a camera) in a video capture mode or image capture mode. A processed image frame can be displayed on the display unit 106. The image frame processed by the graphics processing unit 1041 may be stored in the memory 109 (or other storage mediums) or transmitted via the radio frequency unit 101 or the network module 102. The microphone 1042 may receive a sound and may process such a sound into audio data. The processed audio data may be converted, in a call mode, into a format that may be transmitted to a mobile communication base station by using the radio frequency unit 101 for output.

The terminal device 100 further includes at least one sensor 105, such as an optical sensor, a motion sensor, and other sensors. The light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by a user or information provided to a user. The display unit 106 may include a display panel 1061. The display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device 100. The user input unit 107 includes a touch panel 1071 and another input device 1072. The touch panel 1071, also called a touch screen, may collect touch operation on or near the touch panel by users (for example, operation on the touch panel 1071 or near the touch panel 1071 by fingers or any suitable objects or accessories such as a touch pen by the users). The touch panel 1071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented by various types such as a resistive type, a capacitive type, an infrared ray type or a surface acoustic wave type. In addition to the touch panel 1071, the user input unit 107 may further include another input device 1072. The other input devices 1072 may include but are not limited to: a physical keyboard, a function key (such as a volume control key, a switch key), a trackball, a mouse, and a joystick, which is no longer repeated here.

Optionally, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. In FIG. 13, the touch panel 1071 and the display panel 1061 are used as two independent components to implement input and output functions of the terminal device 100. However, in some embodiments, the touch panel 1071 and the display panel 1061 may be integrated to implement the input and output functions of the terminal device 100. This is not specifically limited herein.

The interface unit 108 is an interface for connecting an external apparatus with the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory, and may further include a nonvolatile memory, for example, at least one disk storage device, a flash memory, or other volatile solid-state storage devices.

The processor 110 is a control center of the terminal device 100, uses various interfaces and circuits to connect each part of the whole terminal device 100, and performs various functions and processing data of the terminal device 100 by operating or executing a software program and/or module in the memory 109 and calling data stored in the memory 109, so as to integrally monitor the terminal device 100. The processor 110 may include one or more processing units. Optionally, the processor 110 may be integrated with an application processor and a modem processor. The application processor mainly processes the operating system, the user interface, applications, etc. The modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, the embodiment of the present disclosure further provides an electronic device, including a processor, a memory, and a computer program stored in the memory and executable on the processor 110. When the computer program is executed by the processor, the processes of the foregoing shooting method embodiment are implemented, and a same technical effect can be achieved. To avoid repetition, details are not described herein again.

An embodiment of the present disclosure further provides a non-transitory computer readable storage medium. The non-transitory computer readable storage medium stores a computer program, and when the computer program is executed by a processor, the foregoing processes of the shooting method embodiment are implemented, and a same technical effect can be achieved. To avoid repetition, details are not described herein again. The non-transitory computer readable storage medium is, for example, a read-only memory (ROM), a random access memory (RAM), a magnetic disk, or an optical disk.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on the understanding, the technical solutions of the present disclosure essentially or the part that contributes to the prior art may be embodied in the form of software products. The computer software product is stored in a storage medium (such as ROM/RAM, a magnetic disk and an optical disk), including several instructions for enabling one electronic device (which may be a mobile phone, a computer, a server, an air conditioner, or a network device) to implement the method in each embodiment of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A shooting method, applied to an electronic device comprising a display screen and a camera, wherein the camera is located below the display screen, the display screen comprises a first polarizer and a second polarizer, a liquid crystal is arranged between the first polarizer and the second polarizer, incident light passes through the first polarizer, the liquid crystal and the second polarizer to enter the camera, and the method comprises:

adjusting an electrode voltage of the display screen as a target voltage value, wherein in a case that the electrode voltage of the display screen is the target voltage value, a light transmittance of the display screen meets a preset condition; and acquiring a first image through the camera;

wherein before the adjusting the electrode voltage of the display screen as the target voltage value, the method further comprises:
determining a target aperture value of the camera;
wherein the determining the target aperture value of the camera comprises:
adjusting an exposure value of the camera; and
in a case that a target brightness corresponding to a current exposure value is matched with a preset brightness, taking an aperture value corresponding to the current exposure value as the target aperture value; wherein
the target brightness is a brightness of a picture shot by the camera under the current exposure value.

2. The method according to claim 1, wherein
the adjusting the electrode voltage of the display screen as the target voltage value comprises:
adjusting the electrode voltage of the display screen as the target voltage value corresponding to the target aperture value; wherein
in a case that the electrode voltage of the display screen is the target voltage value, the light transmittance of the display screen is matched to a light transmittance corresponding to the target aperture value.

3. The method according to claim 1, wherein before the determining the target aperture value of the camera, the method further comprises:
displaying a shooting interface, and
receiving a first input performed by a user on the shooting interface; and
the determining the target aperture value of the camera comprises:
determining the target aperture value of the camera in response to the first input.

4. The method according to claim 3, wherein the shooting interface comprises a target adjusting control, and the first input is a first input for the target adjusting control.

5. The method according to claim 2, wherein the adjusting the electrode voltage of the display screen as the target voltage value corresponding to the target aperture value comprises:
adjusting the electrode voltage of a target area corresponding to the camera in the display screen as the target voltage value.

6. The method according to claim 1, wherein after the adjusting the electrode voltage of the display screen as the target voltage value, the method further comprises:
displaying target aperture information corresponding to the target voltage value in a shooting interface.

7. An electronic device, comprising a processor, a memory, and a computer program stored in the memory and executable on the processor, wherein the electronic device comprises a display screen and a camera, the camera is located below the display screen, the display screen comprises a first polarizer and a second polarizer, a liquid crystal is arranged between the first polarizer and the second polarizer, incident light passes through the first polarizer, the liquid crystal, and the second polarizer to enter the camera, and the computer program, when executed by the processor, causes the electronic device to perform:
adjusting an electrode voltage of the display screen as a target voltage value, wherein in a case that the electrode voltage of the display screen is the target voltage value, a light transmittance of the display screen meets a preset condition; and
acquiring a first image through the camera;
wherein the computer program, when executed by the processor, causes the electronic device to further perform:
determining a target aperture value of the camera;
wherein the determining the target aperture value of the camera comprises:
adjusting an exposure value of the camera; and
in a case that a target brightness corresponding to a current exposure value is matched with a preset brightness, taking an aperture value corresponding to the current exposure value as the target aperture value; wherein
the target brightness is a brightness of a picture shot by the camera under the current exposure value.

8. The electronic device according to claim 7, wherein
the computer program, when executed by the processor, causes the electronic device to perform:
adjusting the electrode voltage of the display screen as the target voltage value corresponding to the target aperture value; wherein
in a case that the electrode voltage of the display screen is the target voltage value, the light transmittance of the display screen is matched to a light transmittance corresponding to the target aperture value.

9. The electronic device according to claim 8, wherein the computer program, when executed by the processor, causes the electronic device to further perform:
displaying a shooting interface, and
receiving a first input performed by a user on the shooting interface; and
the determining the target aperture value of the camera comprises:
determining the target aperture value of the camera in response to the first input.

10. The electronic device according to claim 9, wherein the shooting interface comprises a target adjusting control, and the first input is a first input for the target adjusting control.

11. The electronic device according to claim 8, wherein the computer program, when executed by the processor, causes the electronic device to perform:
adjusting the electrode voltage of a target area corresponding to the camera in the display screen as the target voltage value.

12. The electronic device according to claim 7, wherein the computer program, when executed by the processor, causes the electronic device to further perform:
displaying target aperture information corresponding to the target voltage value in a shooting interface.

13. A non-transitory computer readable storage medium, wherein the non-transitory computer readable storage medium stores a computer program; and the computer program, when executed by a processor of an electronic device, causes the electronic device to perform:
adjusting an electrode voltage of a display screen as a target voltage value, wherein in a case that the electrode voltage of the display screen is the target voltage value, a light transmittance of the display screen meets a preset condition; and
acquiring a first image through a camera; wherein
the electronic device comprises the display screen and the camera, the camera is located below the display screen, the display screen comprises a first polarizer and a second polarizer, a liquid crystal is arranged between the first polarizer and the second polarizer, incident light passes through the first polarizer, the liquid crystal, and the second polarizer to enter the camera;

wherein the computer program, when executed by the processor, causes the electronic device to further perform:
  determining a target aperture value of the camera;
  wherein the determining the target aperture value of the camera comprises:
  adjusting an exposure value of the camera; and
  in a case that a target brightness corresponding to a current exposure value is matched with a preset brightness, taking an aperture value corresponding to the current exposure value as the target aperture value; wherein
  the target brightness is a brightness of a picture shot by the camera under the current exposure value.

14. The non-transitory computer readable storage medium according to claim 13, wherein
  the computer program, when executed by the processor, causes the electronic device to perform:
  adjusting the electrode voltage of the display screen as the target voltage value corresponding to the target aperture value; wherein
  in a case that the electrode voltage of the display screen is the target voltage value, the light transmittance of the display screen is matched to a light transmittance corresponding to the target aperture value.

15. The non-transitory computer readable storage medium according to claim 14, wherein the computer program, when executed by the processor, causes the electronic device to further perform:
  displaying a shooting interface, and
  receiving a first input performed by a user on the shooting interface; and
  the determining the target aperture value of the camera comprises:
  determining the target aperture value of the camera in response to the first input.

16. The non-transitory computer readable storage medium according to claim 14, wherein the computer program, when executed by the processor, causes the electronic device to perform:
  adjusting the electrode voltage of a target area corresponding to the camera in the display screen as the target voltage value.

17. The non-transitory computer readable storage medium according to claim 13, wherein the computer program, when executed by the processor, causes the electronic device to further perform:
  displaying target aperture information corresponding to the target voltage value in a shooting interface.

* * * * *